Feb. 18, 1958  H. F. BAUMAN  2,824,164
DEFERRED ACTION BATTERY
Filed Sept. 23, 1955  3 Sheets-Sheet 1
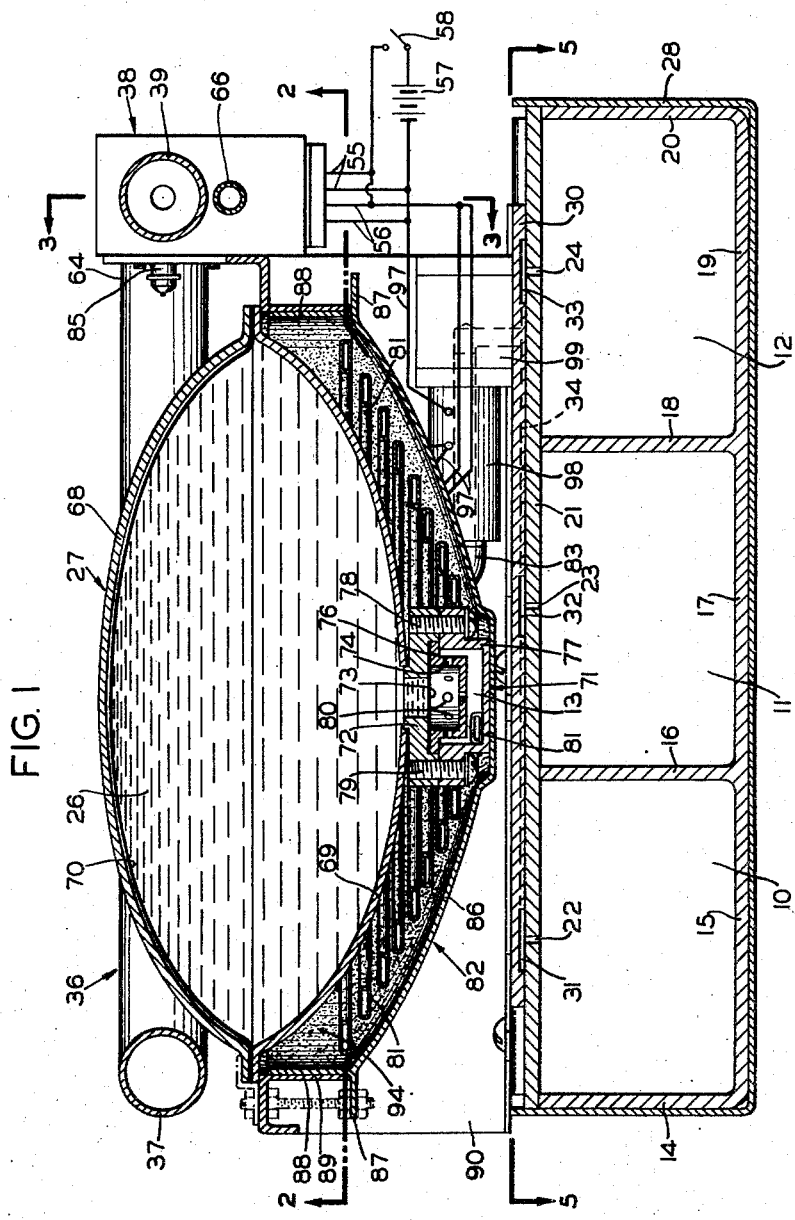
INVENTOR
HUBERT F. BAUMAN
BY *George S. Hastings*
ATTORNEY Feb. 18, 1958 H. F. BAUMAN 2,824,164
DEFERRED ACTION BATTERY
Filed Sept. 23, 1955 3 Sheets-Sheet 2
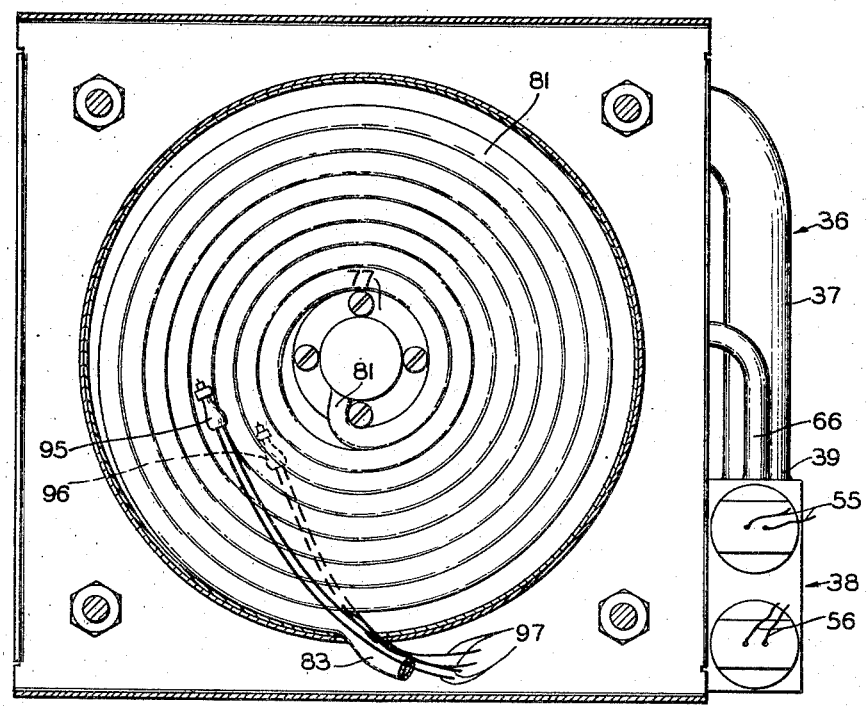
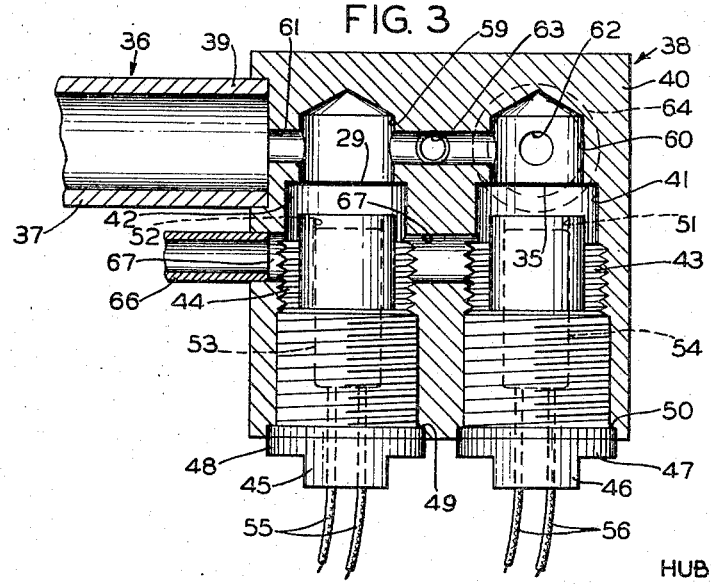
INVENTOR
HUBERT F. BAUMAN
BY George S. Hastings
ATTORNEY Feb. 18, 1958     H. F. BAUMAN     2,824,164
DEFERRED ACTION BATTERY
Filed Sept. 23, 1955     3 Sheets-Sheet 3

INVENTOR
HUBERT F. BAUMAN
BY George S. Hastings
ATTORNEY

United States Patent Office 2,824,164
Patented Feb. 18, 1958

2,824,164

DEFERRED ACTION BATTERY

Hubert F. Bauman, Raleigh, N. C., assignor to American Machine & Foundry Co., a corporation of New Jersey Application September 23, 1955, Serial No. 536,122

10 Claims. (Cl. 136—90)

This invention relates to deferred action batteries and more particularly to the batteries where electrolyte is stored in a reservoir and is conveyed or allowed to fill the battery cell compartments only when it is desired to put the battery into use.

There are a number of applications for small batteries which require activation of the battery cells immediately prior to their actual use. In the batteries of the above type, it is necessary to store an electrolyte in a separate vessel and then provide an appropriate mechanism for rapidly conveying such electrolyte to the cell compartments immediately before their use. This invention discloses such mechanism. Storage of the electrolyte in a separate electrolyte compartment is necessary to prevent aging and general deterioration of the battery cells.

The invention also discloses an additional apparatus for heating the electrolyte upon its release from the reservoir if the battery is used at low ambient temperatures. When ambient temperatures are below the operating temperature of cells, it is necessary to preheat the batteries to a temperature which will produce their optimum operation. This is accomplished in the disclosed invention by passing the aqueous electrolyte through a heat exchanger and thus heating said electrolyte when it is conveyed from the reservoir to the cells. Such heating of the aqueous electrolyte is very effective in obtaining the optimum operating temperatures because its specific heat is very high and therefore it can absorb sufficient amount of heat without boiling, thus acting as an effective heat carrier for subsequent transfer of some of the absorbed heat to the plates, case, and cell components. Heat must be added to the electrolyte very rapidly in order to minimize the time necessary for activating the cells. The disclosed heat exchanger uses thin copper wall tubing heated by a heat powder capable of producing an exothermic chemical reaction. This chemical reaction is started at the same time the electrolyte flow is started through the heat exchanger, producing very fast battery activating periods.

The deferred action battery includes a metallic gas reservoir containing some inert gas under pressure, of the order of several hundred pounds per square inch. The inert gas which is suitable for the intended use may be nitrogen, and suitable gas pressure which is used in one specific example is 700 pounds per square inch. This gas is released by the firing of an electric squib or squibs, and it then flows into a space formed between the solid wall and the flexible diaphragm of the electrolyte chamber after the gas begins to separate or depress the diaphragm away from the solid wall. The flexible diaphragm forces the electrolyte through a coiled spiral of tubing or the heat exchanger, the tubing being surrounded by a heat powder which is activated concurrently with the firing of the squib and the resulting flow of the electrolyte through the heat exchanger. While electrolyte flows through the coiled tubing, it is heated by the heat powder. The heat exchanger tubing conveys the electrolyte into a plurality of cells through a series of flow channels or ducts which evenly distribute and fill each cell with the electrolyte. The cells are then ready to act as a source of direct current.

It is therefore an object of this invention to provide a deferred action battery including a plurality of cells which become activated when an electrolyte stored in a separate compartment is conveyed to the cells through a heat exchanger after a simultaneous activation of the heat exchanger and opening of the electrolyte reservoir valves.

Still another object of this invention is to provide a deferred action battery in which the cells are filled with electrolyte from an electrolyte reservoir by exerting a gas pressure on the electrolyte.

Yet another object of this invention is to provide a deferred action battery including a gas tank filled with an inert gas under pressure, an electrolyte tank filled with an aqueous electrolyte, a heat exchanger surrounded by heat powder, and a plurality of battery cells, the electrolyte being transferred from the electrolyte tank into the battery cells through said heat exchanger upon the opening of the valve between the gas tank and the electrolyte tank and the simultaneous activation of the heat exchanger by the initiation of the exothermal reaction in the heat powder.

It is an additional object of this invention to provide a deferred action battery of the above type in which activation of the heat powder and opening of the gas tank valve are accomplished by means of electric squibs.

Still another object of this invention is to provide a delayed activation battery in which the battery cells do not contain any liquid electrolyte during a storage period but are automatically filled with the electrolyte from an electrolyte tank, all cells being filled equally and evenly with the electrolyte, irrespective of their position in space; i. e., as to whether or not the cells are in a horizontal plane, a vertical plane, or any intermediate plane between the horizontal and vertical planes.

Yet another object of this invention is to provide a deferred action battery having a plurality of cells, an electrolyte tank filled with liquid electrolyte, which is transferred into the cells at the moment of putting such battery into use, and a heat exchanger for bringing the filled cells to their proper operating temperature by heating said electrolyte when the latter travels from the electrolyte tank to the cells, said heat exchanger being put into use only when the battery temperature is below its optimum operating temperature.

The novel features which are believed to be characteristic of the invention, both as to its organization and method of operation, together with further objects and advantages thereof, will be better understood from the following description taken in connection with the accompanying drawings in which several embodiments of the invention are illustrated as examples of the invention. It is to be expressly understood, however, that the drawings are for the purpose of illustration and description only, and are not intended as definition of the elements of the invention. Referring to the drawings:

Figure 1 is a vertical sectional view of the battery cells, electrolyte and gas tanks of the heat exchanger;

Figure 2 is a plan view of the heat exchanger and battery casing taken along line 2—2 shown in Fig. 1;

Figure 3 is a transverse vertical section of gas release valves taken along line 3—3 shown in Fig. 1;

Figure 5:
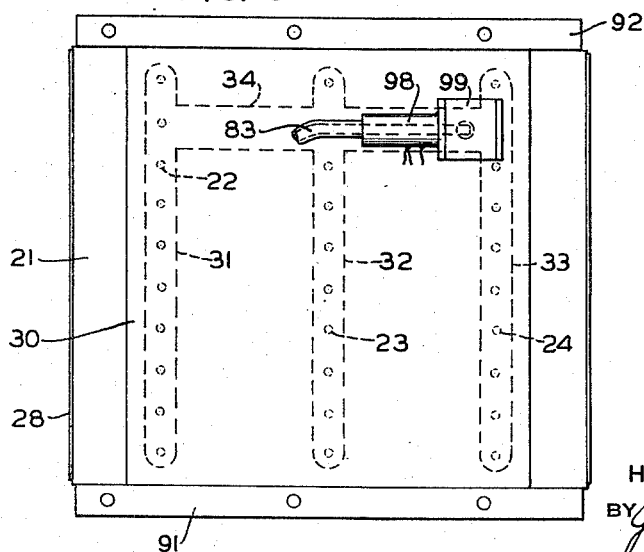
Figure 5 is a plan view of the battery manifold and cover assembly taken along line 5—5 shown in Fig. 1.

Referring to all the figures, where the same elements bear the same numerals, the invention is illustrated by the way of an example with a three-cell battery. It is applicable to a larger number of cells in which case the tank elements, etc., are proportioned to perform their functions for a larger number of cells. The three cells are cells 10, 11 and 12, which normally contain a number of conventional battery or cell plates and separators contained in individual compartments within the cell and which are well known to the battery art and therefore are not illustrated in the drawings. Therefore, the cells in Fig. 1 are illustrated merely as empty boxes having external walls 14—20 and a cover plate 21 having three rows 22, 23 and 24, of holes within the plate 21. The holes are used for filling each individual cell compartment within cells 10, 11 and 12 with an electrolyte 26 normally contained in the electrolyte tank or reservoir 27. The cells are mounted in a metallic case, or cell frame, 28 which surrounds the cells. The compartments 14—20 and cover 21 are made of any suitable acid-resistant material such as hard rubber or plastic material such as polystyrene. An additional plate or an electrolyte-distributor cover 30, also made of acid-resistant material is mounted directly on top of plate 21 and is plasticized or cemented to plate 21 so as to form a liquid-tight joint with cover plate 21. The plan view of the distributor cover 30 is illustrated in Fig. 5. This cover is provided with three transverse channels 31, 32 and 33 and a longitudinal channel 34. A plurality of holes, or orifices, 22, 23 and 24, are uniformly distributed through the lengths of the transverse channels, these orifices being located in plate 21 and each being disposed directly over a corresponding cell compartment. Electrolyte 26 first enters longitudinal channel 34 and then flows through the transverse channels 31, 32 and 33. It then flows through the orifices 22, 23 and 24 and into cell chambers 10, 11 and 12, thus filling the cell compartments, with the concomitant activation of the battery. Because of relatively high pressure of the gas contained in gas reservoir 36 which is used for acting as a motive force for conveying electrolyte 26 into the cells, all cells are filled with the electrolyte quite rapidly, and to the same level, through the orifices 22, 23 and 24. This gas under pressure also enables one to fill all three cells with the electrolyte, irrespective of the position of the cells in space; i. e., whether the cells are in a horizontal position, as illustrated in Fig. 1, or in some tilted position, the latter position may be assumed by the cells, should be used in connection with some moving element, such as a radiosonde, guided missile, etc. The electrolyte is conveyed into the cells in the manner described more in detail below.

The gas tank 36 consists of a metallic tube 37 bent into an outline of a rectangle. Two ends of the tube or pipe 37 terminate in an activator housing 38, the cross-sectional view of which is illustrated in Fig. 3. Referring now more in particular to Fig. 3, the tube ends, such as an end 39 illustrated in Fig. 3, is welded or brazed to block 40 of the activator housing so that pipe 37 forms a gas-tight joint with the block. The block is provided with two cylindrical bores 41 and 42, which are used for mounting threaded plugs 43 and 44 within the threaded portions of the bores. The plugs terminate in the rectangularly shaped extensions 45 and 46 which are used as wrench-engaging elements for tightly screwing the plugs into the bores. The plugs are also provided with cylindrical seats 47 and 48 having shoulders 49 and 50 which engage the corresponding seats provided in block 40. The seats form a gas-tight joint with block 40. Blocks 44 and 43 are, in turn, provided with hollow cylindrical portions 51 and 52, which are used for mounting two electrical squibs 53 and 54.

Covering the mouths of bores 41, 42 are thin diaphragms 29 and 35, respectively, which function as gas valves and have a thickness sufficient to withstand the pressure of the gas contained in tank 36, but are adapted to be ruptured by explosion of squibs 53, 54. A suitable material for the diaphragms 29 and 35 is silver sheeting.

Figure 4:
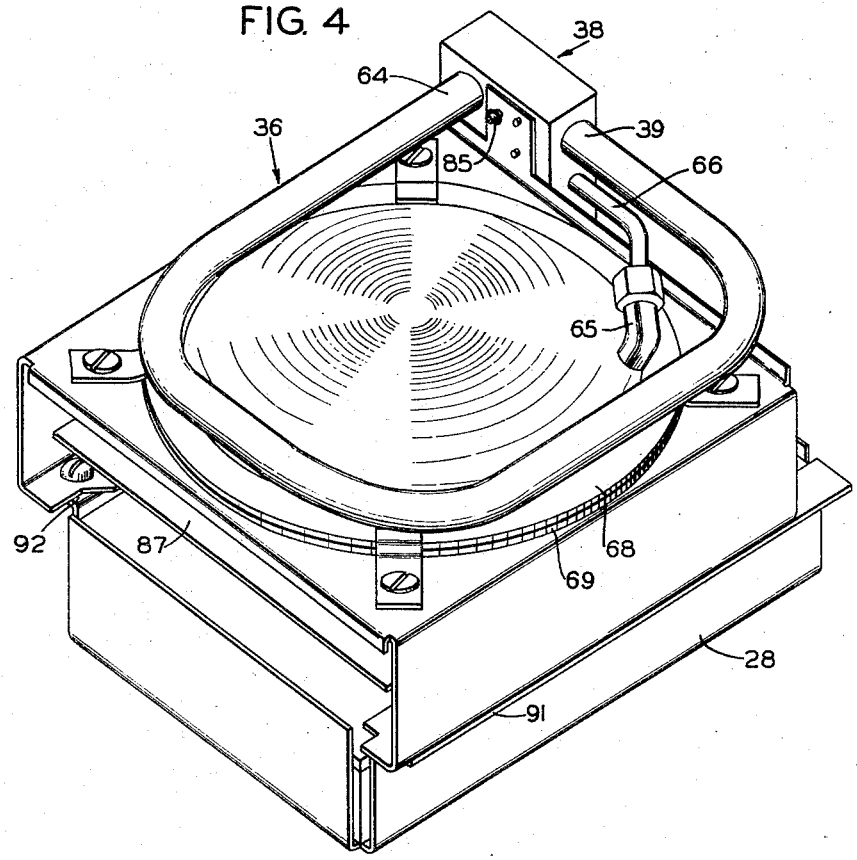
Figure 4 is a perspective view of the entire delayed action battery.

Each squib is connected to a source of direct current 57, illustrated in Fig. 1, connected to the squib conductors through a switch 58. These pairs of conductors 55 and 56 are sealed with an appropriate cement or wedged within the respective plugs 43 and 44 so as to make a gas-tight joint with the plugs. Block 40 is also provided with cylindrical bores 59, 60, 61, 62 and 63. Bore 61 connects bores 59 and 60 to the gas tank pipe 37 since one end of bore 61 opens directly into end 39 of pipe 37, as illustrated in Fig. 3, while the other end of bore 61 opens into the cylindrical bore 60. The opposite end 64 of pipe 37 is also connected to block 40 in the same manner as the end 39, forming a gas-tight joint with the block, and is connected to the bores 59, 60 and 61 through bore 62 which is identical to bore 61 illustrated in Fig. 3. Accordingly, the gas ducts 61 and 62 convey the compressed gas contained in the gas tank to the outgoing gas pipe 66, one end of which is connected to the cylindrical bores 41 and 42 within block 40 through a bore 67 within the block. The opposite end of pipe 66 is connected to a pipe 65 through a gas-tight nipple joint illustrated in Fig. 4. Pipe 65 opens into the electrolyte tank and makes a gas-tight joint with the upper shell 68 of the electrolyte tank. The electrolyte tank 27 includes the upper dome-shaped shell 68, the lower shell 69 (see Fig. 1), a flexible diaphragm 70, and the base assembly 71. The base assembly includes a nipple 72 welded onto the lower shell 69 of the electrolyte reservoir 27. The lower shell 69 has a centrally located opening so that the electrolyte can pass through this opening and through the corresponding opening in nipple 72 until it encounters a valve in the base assembly 71 which is indicated in Fig. 1 as consisting of flat plate or diaphragm 73. This plate, which may be a thin silver plate, rests on the nipple and forms a gas-tight or liquid-tight joint with nipple 72. This is accomplished by pressing diaphragm or plate 73 against the flat-surface of nipple 72 by means of a strainer member 76. Strainer 76 is held tightly against the nipple 72 by means of a cap member 77, and is provided with a channel 74 having a plurality of orifices 80, connected thereto.

Cap 77 is held tightly against strainer member 76 by means of a plurality of set-screws, such as set-screws 78 and 79.

When gas pressure is applied on the flexible diaphragm 70, the diaphragm becomes depressed away from the inner wall of shell 68 and the gas begins to flow into the space formed between the upper surface of the flexible diaphragm 70 and the inner surface of the upper cell 68. This gas pressure displaces the diaphragm 70 against the hydraulic pressure of the electrolyte 26. The strength of the silver plate or diaphragm 73 is so proportioned (in one specific example it is 0.001 inch thick) that it breaks down when subjected to the full gas pressure. Accordingly, the electrolyte reservoir becomes connected to the strainer channel 74 which, as may be remembered, is provided with a plurality of orifices 80. These orifices connect the electrolyte reservoir to the intake of pipe 81 of the heat exchanger 82 with the result that the electrolyte then flows through the heat exchanger and out through pipe 83 and into the longitudinal channel 34 in plate 30. Such flow of the electrolyte eventually leads to the filling of the cells 10, 11 and 12 with the electrolyte in the manner described previously.

Before completing the description of the gas tank, it should be noted here that the gas tank, and especially its activator housing 38, is provided with a fill-in one-way flow valve 85 which communicates with the gas cylinder 36 through bore 63 in the activator housing 38. The gas tank is filled with gas through valve 85. As mentioned previously, a suitable working gas pressure for the disclosed deferred action battery may be of the order of 700 pounds per square inch, and a suitable inert gas is nitrogen. Other inert gases such as argon, helium, etc., may be used, nitrogen being less expensive than other inert gases.

A suitable material for electrolyte tanks is stainless steel when electrolyte is an alkaline solution, although other alkali-resisting materials can also be used. If the plates of the battery are silver-zinc plates, and the electrolyte is potassium hydroxide, stainless steel is a suitable material for making shells 68 and 69 of the electrolyte tank. A suitable material for the flexible diaphragm 70 is thin, silver sheeting, which functions well over a wide temperature range. While the above examples are cited for silver-zinc batteries, it is to be understood that this invention can be used with batteries which utilize either acid or alkaline electrolytes.

In order to preheat the electrolyte when necessary, as mentioned above, a heat exchanger 82 is provided. This heat exchanger is mounted in a space defined by the lower shell 69 of the electrolyte tank and a matching shell 86, which is held in spaced relationship with respect to shell 69 by means of a flange 87 and in a vertical side wall 88, these being integral parts of the bottom shell 86. Flange 87 abuts against the vertical wall 89 or a bracket or frame member 90 which is mounted on flanges 91 and 92 (see Fig. 4) of the cell frame casing 28 in the manner best illustrated in Fig. 4. The space enclosed by shells 69 and 86 is utilized for mounting the coil 81 of the heat exchanger. This coil begins in a chamber 13 which is directly under the strainer member 76. It then makes a number of spirally or helically shaped turns. The plan view of the coil is illustrated in Fig. 2, and the transverse view is illustrated in Fig. 1. The outermost turn of the coil finally terminates in an outgoing pipe 83, which conveys the electrolyte to the transverse channel 34 in plate 30. The heat exchanger also includes a heat powder 94 which is solidly packed between the shells 69 and 86 and coils 81. In order to prevent distortion of all working elements of the combination, it is best to use a heat powder which does not generate any gas when ignited. Heat powders, the exothermic reactions of which produce large amounts of heat without generating any gas, are zirconium metal or barium chromate. Moreover, such powders do not generate an excessive amount of heat so as to melt the copper tubing 81 of the heat exchanger.

In order to ignite the heat powder, it is necessary to provide one or two electric matches 95 and 96 whose conductors 97 are connected in series with a suitable thermostat 98, to battery 57. Thermostat 98 surrounds pipe 83, and is supported by a suitable mounting block 99 which also serves to secure pipe 83 to channel 34. Of course, it is understood that thermostat 98 may be located at any other suitable position, as long as it is responsive to changes in ambient temperature. Thermostat 98 closes circuit 97 only when the temperature of electrolyte 26 and of the entire battery assembly is below the normal operating temperature of the cells. When this is the case, thermostat 98 automatically closes circuit 97; therefore, when switch 58 is closed, battery 57 not only explodes the squibs 53 and 54, but it also ignites the heat powder 94. Accordingly, the flow of electrolyte through the heat exchanger is synchronized with the generation of heat by the heat powder.

Before concluding the description of this invention, it should be noted that orifice openings 22, 23 and 24 are of such a small size that the air trapped within the cell compartments is not released while electrolyte is filling the cells. Therefore, if the cells find themselves in a tilted position rather than in a horizontal position, and there is a preferential flow of the electrolyte to the lowermost cell, the electrolyte will fill the compartments in such a cell until the back pressure of the tapped air stops such flow and forces the electrolyte into the compartments of the other cells. In this manner, all the cells are filled equally.

The invention thus discloses a deferred action battery which can be energized very effectively and simply by closing switch 58. The disclosed arrangement is free of altitude effects because nitrogen gas is under a reasonably high pressure in the gas tank 36. Further freedom from atmospheric effects may be provided by hermetically sealing the entire unit. Some variation in gas pressure will be present because of the variation in the ambient temperature, but such variation will not be especially marked because the disclosed batteries, as a rule, are energized prior to the release of the moving objects from ground or at the time of the release from the ground. Accordingly, the temperature variations that will be encountered by the gas tank 36 are those equal to the variations in ambient temperature at ground level. The temperature of the electrolyte is controlled by the thermostat 98 and heat exchanger 82; therefore, when the ambient temperature is below the optimum operating temperature of the cell, thermostat 82 is energized and brings the temperature of the electrolyte as well as other cell components to the desired temperature level.

Activation of the battery is very fast because of the very rapid release of gas from tank 36 through two parallelly connected gas valves 29 and 35, and a large number of the cell orifices, such as orifice 22, 23 and 24 which connect the electrolyte tank with the cells. The operating time of the overall combination may be as short as one or two seconds.

The disclosed battery also has an additional advantage in that it is remotely activated by means of electrical squibs and matches. There is a uniform filling of cells in the manner described previously, such uniform filling being obtained in any position of the cells. Because of the short life of the battery, the disclosed battery does not present any gas problems; i. e., it does not generate an excessive amount of gas during its useful life which would subject the battery to an excessive gas pressure and impair its normal functioning. It may be stated here, however, if only parenthetically, that the disclosed combination can be provided with a gas release valve which becomes actuated or released or open upon the activation of all cells. The cells may be connected to a fuse wire which becomes melted when all cells become activated with the concomitant opening of the gas valve. Such opening of the gas valve would release the pressure of the gas which was used in supplying the motive power for transferring of the electrolyte into the cells; it would also release the air trapped in the cells and any subsequently generated gases during the flow of current through the cells.

The cylinder-shaped gas reservoir permits it to withstand high pressure and provides increased volume by using a long tube shaped into a rectangle rather than a conventional cartridge. It should also be noted that nearly all vital operating components of the combination, such as squibs, matches, valves, ducts, etc., are doubled so as to insure the proper operation of the overall combination.

What is claimed as new is:

1. A filling device for filling a deferred action battery of the type having a plurality of cell compartments with orifices for receiving stored electrolyte therethrough to fill said compartments when said battery is placed into service, comprising an electrolyte tank filled with electrolyte, an electrolyte distributor plate having a plurality of interconnected channels in registry with the orifices in the cell compartments, a conduit connecting said electrolyte tank to said electrolyte distributor plate for discharging electrolyte from said tank into said channels, a source of gas pressure having connections to said tank, rupturable diaphragm valve means disposed between said gas source and said conections for discharging said gas into said tank, a flexible diaphragm mounted in said tank and disposed adjacent said gas conections for displacing said electrolyte from said tank to cause it to flow into the cell compartments through said channels and orifices when the pressure of said gas is released, and an electrically energized detonating device for rupturing said diaphragm valve means.

2. The battery filling device as defined in claim 1 in which said source of gas pressure includes a gas tank filled with gas, two parallel ducts connecting said gas tank to said electrolyte tank, a diaphragm valve in each duct, and said detonating device includes an electric squib in each duct for fracturing said diaphragm.

3. The battery filling device as defined in claim 1 which also includes a diaphragm valve between said conduit and said electrolyte tank for normally closing off said tank from said conduit.

4. The battery filling device as defined in claim 1 which also includes a heat powder surrounding said conduit, and means for igniting said heat powder only when the temperature of said electrolyte and of said cells is below the operating temperature of said battery.

5. A filling device for filling a deferred action battery of the type having a plurality of cell compartments adapted to be filled with electrolyte when said battery is placed in service comprising, a tubular gas reservoir having two ends, said gas reservoir being filled with a gas under pressure, an activator housing connected to said two ends, at least one flow channel connected to at least one of said ends, said flow channel having a rupturable diaphragm closing off one end thereof to prevent the flow of gas therethrough, an electric squib mounted in the vicinity of said diaphragm for rupturing said diaphragm upon energization of said squib, an electrolyte tank filled with an electrolyte and having an aperture opening into said flow channel, said electrolyte tank having a flexible diaphragm mounted therein and disposed adjacent said opening for displacing said electrolyte from said tank when said gas presses on said flexible diaphragm upon energization of said squib, an electrolyte distributor for filling said battery cell compartments, a fluid conducting heat exchanger having one end connected to said tank and a second end opening into said electrolyte distributing means, means for selectively actuating said heat exchanger, and a pressure actuated valve disposed between said tank and said heat exchanger, said valve opening in response to the gas pressure acting on said flexible diaphragm upon the rupture of said first-named diaphragm in said flow channel, to allow said electrolyte to flow into said cells.

6. A battery filling device as defined in claim 5 which also includes a heat powder surrounding said heat exchanger, electric matches imbedded in said heat powder, an electric circuit for igniting said matches, and a thermostat in series with said circuit for closing said circuit when said electrolyte is at a temperature which is lower than the normal operating temperature of said cells.

7. A filling device for filling hollow bodies with a fluid comprising a gas tank filled with gas under pressure, a liquid filled tank, said liquid filled tank havng a flexible diaphragm, means connecting said gas and liquid filled tanks for conveying said gas into said liquid filled tank and against the outer surface of said diaphragm, a rupturable diaphragm member closing said connecting means, discharge means for discharging liquid from said second-named tank into a hollow body, and a detonating device operative in response to an electrical signal for rupturing said diaphragm closing member and opening said connecting means, thereby forcing fluid to flow from said liquid-filled tank through said discharge means when said first-named diaphragm is flexed by said gas pressure.

8. The filling device defined in claim 7 which also includes a heat exchanger serially connected between said liquid filled tank and said discharge means.

9. The filling device defined in claim 8 which also includes a heat powder surrounding said heat exchanger.

10. A filling device for filling hollow bodies with a fluid comprising a liquid filled tank, said tank being connected to a hollow body through a first pressure operated valve, a gas tank connected to said liquid filled tank, said gas tank being filled with a gas under pressure, a second pressure operated valve between said tanks, and a detonating device operative in response to a selected electrical signal for opening said second valve, said gas opening said first valve by exerting pressure on said electrolyte upon the opening of said second valve.

References Cited in the file of this patent

UNITED STATES PATENTS

| 161,246 | Leiter | Mar. 23, 1875 |
| 851,353 | Hite | Apr. 23, 1907 |
| 2,404,144 | Riggs et al. | July 16, 1946 |
| 2,529,511 | Murphy | Nov. 14, 1950 |

FOREIGN PATENTS

| 726,391 | Great Britain | Mar. 16, 1955 |